United States Patent [19]
Boller et al.

[11] 3,827,769
[45] Aug. 6, 1974

[54] TRACTION MOTOR SUSPENSION BEARING LUBRICATOR

[75] Inventors: George E. Boller; Richard J. Renk, both of Winona, Minn.

[73] Assignee: Gladys Miller, Winona, Minn.

[22] Filed: Mar. 26, 1973

[21] Appl. No.: 344,769

[52] U.S. Cl. ............................................. 308/132
[51] Int. Cl. ......................................... F16c 33/66
[58] Field of Search .................................. 308/132

[56] References Cited
UNITED STATES PATENTS
2,738,242  3/1956  Horkenrider ...................... 308/132
3,210,138  10/1965  Boller et al. ...................... 308/132

Primary Examiner—Charles J. Myhre
Assistant Examiner—Frank Susko
Attorney, Agent, or Firm—Richard J. Renk

[57] ABSTRACT

A traction motor suspension bearing lubricator having a carrier with a cooperating member to provide for correct registration.

5 Claims, 9 Drawing Figures

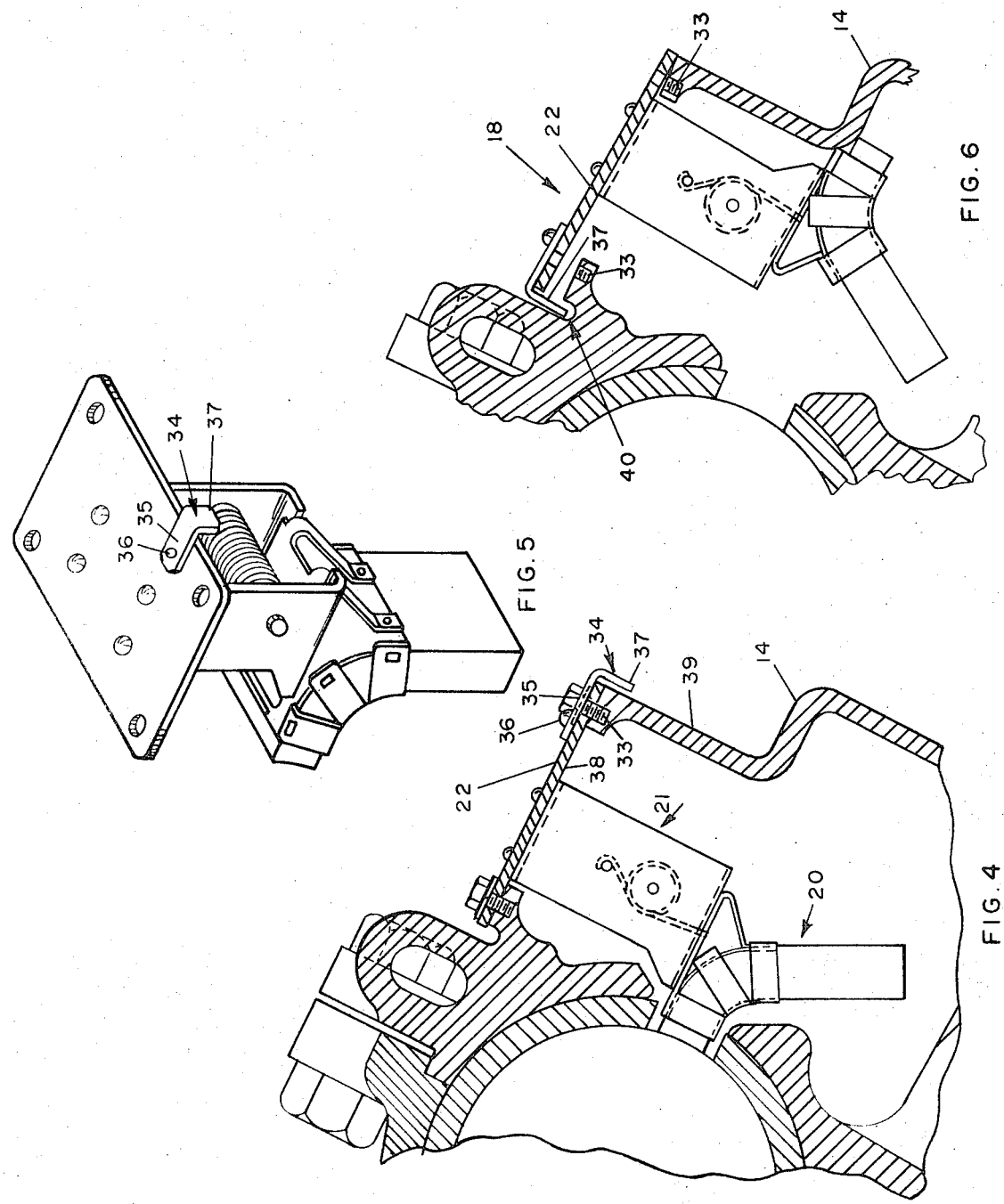

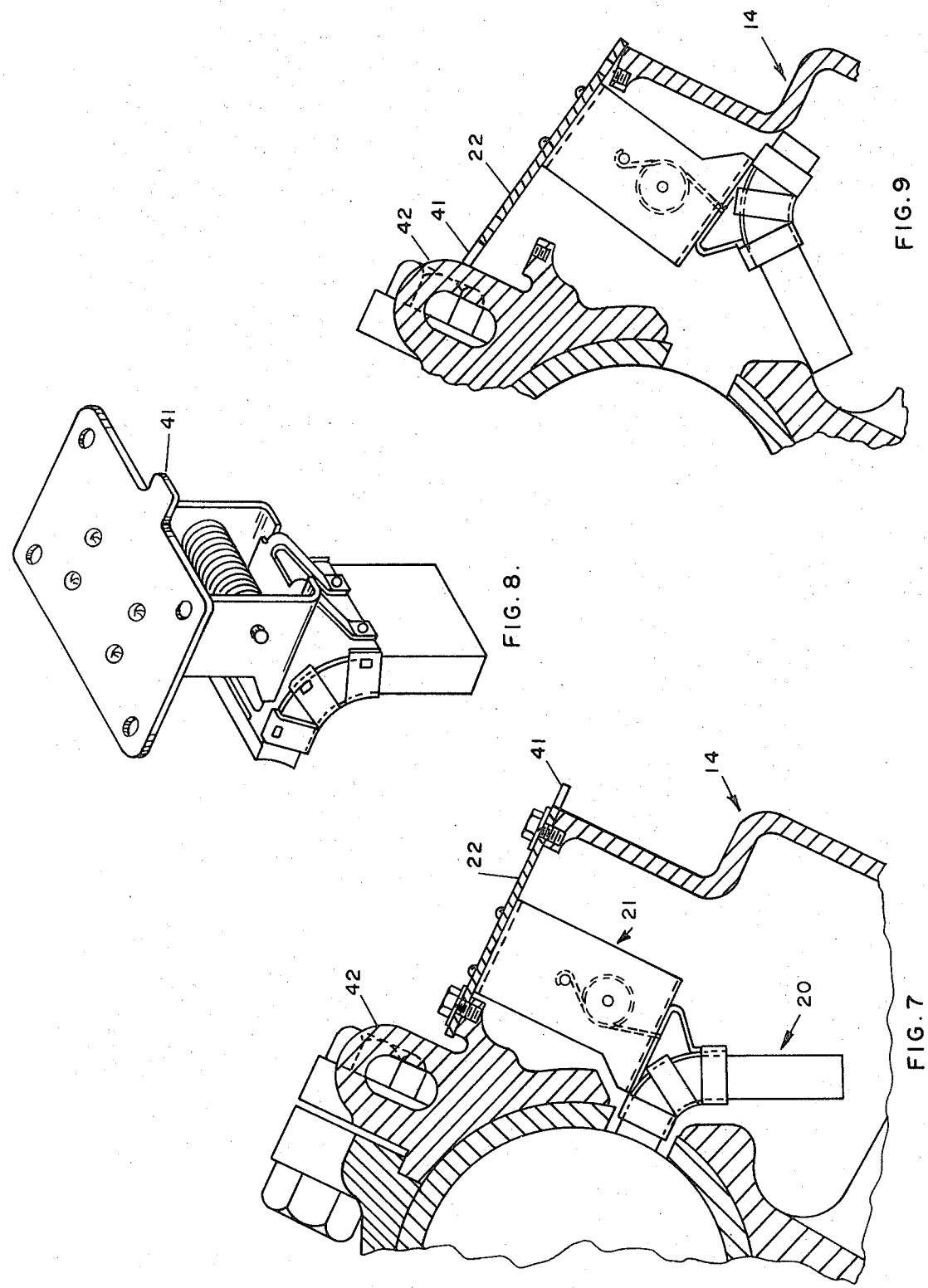

TRACTION MOTOR SUSPENSION BEARING LUBRICATOR

BACKGROUND OF INVENTION

The present invention relates to lubricators for traction motor suspension bearings such as may be found on diesel and electric locomotives and described in U.S. Pat. No. 2,980,472. Ordinarily a lubricator is suspended from suspension bearing axle cap or retainer having a lubricant reservoir therein. The lubricator includes a wick member which conducts lubricant from the reservoir to the journal on the locomotive axle through a window opening formed in one side of the bearing assembly.

Because of the critical nature of the application, it is highly important that the lubricator and its wick member be installed in correct registration with the suspension bearing window so as to apply oil to the journal.

SUMMARY OF INVENTION

The present invention makes certain proper registration is achieved with a lubricator by providing means on the lubricator which prevents it from being incorrectly installed.

This is accomplished by including a cooperating member thereon which provides interfering engagement with the traction motor axle cap to make it impossible for the lubricator to be incorrectly installed in the axle cap reservoir.

DESCRIPTION OF DRAWINGS

FIG. 4 is a fragmentary vertical section showing another embodiment of the invention mounted in a traction motor axle cap.

FIG. 5 is a perspective view of the embodiment shown in FIG. 4.

FIG. 6 is a vertical section similar to FIG. 4 showing how the embodiment of FIGS. 4 and 5 tilts when incorrectly installed.

FIG. 7 is a fragmentary vertical section of a further embodiment of the invention mounted in a traction motor axle cap.

FIG. 8 is a perspective view of the embodiment shown in FIG. 7, and

FIG. 9 is a vertical section similar to FIG. 7 showing how the embodiment of FIGS. 7 and 8 prevents proper installation when incorrectly installed.

PREFERRED EMBODIMENTS

Figure 3:
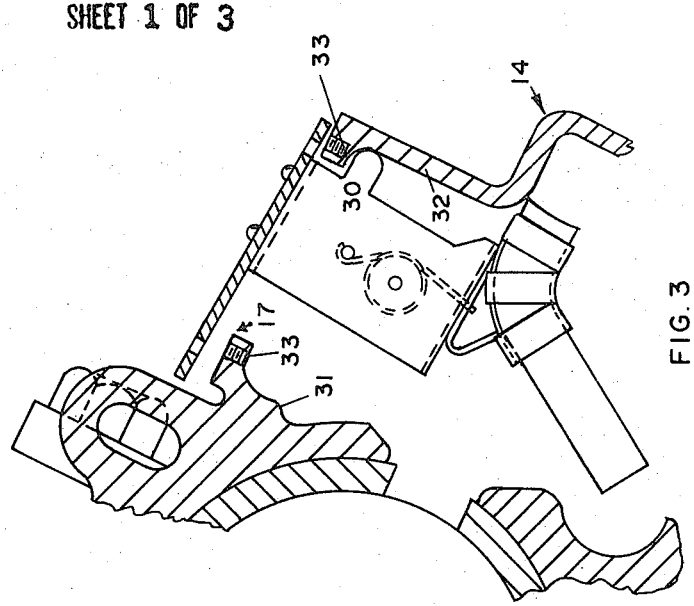
FIG. 3 is a fragmentary vertical section similar to FIG. 1 showing how the lubricator shown in FIGS. 1 and 2 tilts and will not seat properly if it is incorrectly applied.

In the drawings, numeral 10 generally indicates a typical traction motor suspension bearing assembly. The assembly includes a bearing liner or shell 11 which surrounds the axle 12. Bearing 11 is held in position against the axle 12 by a portion of the traction motor casing 13 and by an axle cap 14 through bolts 15.

The axle cap 14 has lubricant or oil reservoir 16, and an inspection or lubricator mounting opening 17 which is generally rectangular in shape.

The improved lubricator of the invention is generally shown at 18 (FIG. 1) and serves to lift oil from the reservoir 16 and apply it to the axle 12 through a window opening 19 extending through the axle cap 14 and bearing 11.

The lubricator 18 includes a lubricating body or wick 20 suspended from a carrier 21. For purposes of illustration, a typical carrier has a cover plate 22 which serves as a mounting means to locate the lubricating body or wick relative to the mounting or inspection opening 17.

The lubricating wick is of a special high capillary material and is held in a somewhat arcuate shape by a tubular holder or trough 23. The upper portion of the wick extends through the axle cap and bearing window 19 and so as to place the applicator face 24 thereof in contact with the axle 12. The lower end or tail 25 of the wick extends into oil (not shown) in the reservoir 16.

To support the lubricating body, the carrier 21 has support means in the form of depending vertically disposed sides 26 secured by rivets or the like to the underside of the cover plate 22. The lower edges of the sides 26 are bent inwardly toward one another to form trackways 27.

Wick 20 is slideably suspended from the carrier sides by a slide plate bracket 28 attached to the top of the arcuate trough 23. The bracket 28 has a channel (not shown) formed on each side thereof into which the trackways 27 extend for support and guidance. Biasing springs 29 urge the wick toward the journal.

Now, in accordance with the invention, it is imperative that the lubricator be installed in correct position so that the lubricating face 24 of the wick can apply oil to the journal surface of the axle. If the wick is incorrectly installed, the bearing could fail very easily. To assure proper installation, the present invention provides means carried by the lubricator, which will coact with the axle cap and prevent the lubricator from being incorrectly secured thereto.

Figure 2:
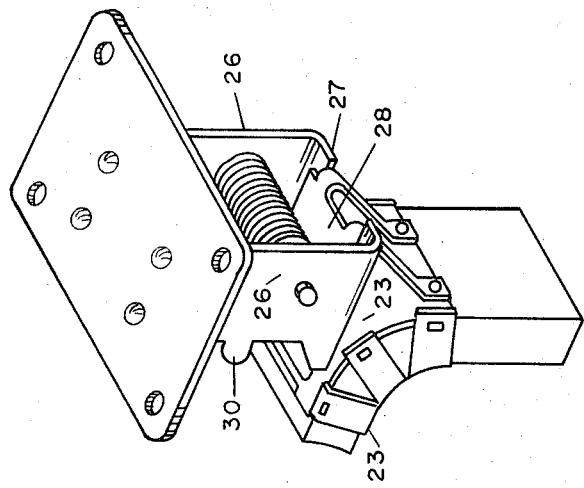
FIG. 2 is a perspective view of the lubricator shown in FIG. 1.
Figure 1:
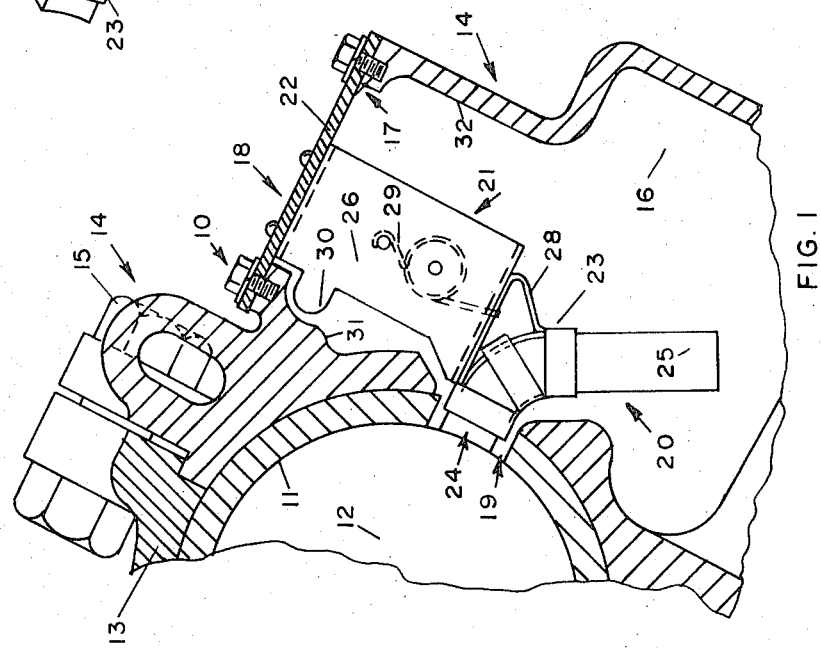
FIG. 1 is a fragmentary vertical section through a traction motor suspension bearing and axle cap showing a lubricator employing one embodiment of the invention.

Specifically, in the embodiment shown in FIGS. 1 – 3, to prevent incorrect installation, there is provided a boss 30 which projects outwardly from one or both of the carrier sides 26. When the lubricator is properly installed there is no interference between the boss 30 and the internal wall 31 of the axle cap reservoir. On the other hand, as shown in FIG. 3, if the lubricator is inserted incorrectly into the axle cap, the boss 30 will engage the rear inside of the reservoir wall 32 and prevent the cover plate from seating or aligning with the bolt holes 33 along the rim of the inspection opening 17.

Another embodiment of the invention is shown in FIGS. 4 – 6. In this version there is provided an angular tab 34 secured to extend to the rear of the cover plate 32. The tab has a leg 35 secured by a rivet or spot weld 36 to the top of the cover plate. Another leg 37 is disposed at an angle to the leg 35 and extends below the plane of the cover plate bottom 38 to overhang and to be spaced slightly away from the outside back wall 39 (FIG. 4) of the axle cap 14. The slight spacing away from the side wall 39 allows the lubricator to be installed easily without being obstructed by slight variations in the axle cap casting or forming dimensions.

If the lubricator 18 is installed incorrectly as shown in FIG. 6, the leg 37 of the tab 34 will engage a portion of the top side 40 of the axle cap 14 and prevent the lubricator cover plate 22 from seating and aligning with the bolt holes 33. While the tab 34 has been shown riveted to the cover plate, it of course may be formed as an integral part of the cover plate.

An additional embodiment of the invention is shown in FIGS. 7 – 9. In such embodiment, the cover plate 22 has a finger 41 extending from a side edge of the cover plate 22 in substantially the same plane thereof. Should the lubricator be installed incorrectly, the finger 41 will engage a portion of the axle cap such as the vertical wall 42 shown in FIGS. 7 and 9. The finger 41 may be stamped or cast as an integral part of the cover plate or, a separate finger piece may be attached by riveting or spot welding, etc.

Another means of assuring correct installation is to stagger the bolt holes in the cover plate 22 (and corresponding axle cap holes 33) with respect to one another.

While the invention has been described with reference to a specific model lubricator, it is obvious that the concepts can be employed with other types and versions without departing from the scope of the claims.

What we claim is:

1. A lubricator device for applying lubricant to a rotatable journal from a lubricant reservoir, comprising, a lubricator body holder,
   a lubricator body carried by said holder for carrying lubricant from said reservoir and applying it to said rotatable journal,
   a carrier mounting said lubricator body holder for movement toward and away from said journal,
   mounting means secured to said carrier for attaching said carrier to said lubricant reservoir,
   biasing means carried by said carrier for urging said holder and said lubricator body toward said journal so as to place said lubricating body in contact with said journal, and
   means carried by said mounting means for preventing said lubricator body from being inserted incorrectly into said lubricant reservoir.

2. A carrier for traction motor suspension bearings provided with an axle cap having an oil reservoir with an inspection opening therefor and a window opening above the oil level in said axle cap which provides access to an axle journal, comprising, support means for carrying a lubricating means so as to apply a lubricant to said journal,
   mounting means connected to said support means for securing said support means to said axle cap, and means carried by said mounting means for preventing said support means and said lubricating means from being installed incorrectly in said reservoir.

3. A carrier as claimed in claim 2 wherein said mounting means includes a cover plate and said means for preventing incorrect installation includes a tab on said cover plate which is adapted to engage a portion of said axle cap if the carrier is incorrectly installed.

4. A carrier as claimed in claim 2 wherein said tab includes an angularly disposed portion which projects below the plane of the underside of said cover plate.

5. A carrier as claimed in claim 2 wherein said tab projects from said cover plate in approximately the same plane as said cover plate.

* * * * *